N. R. RENZE.
DIRIGIBLE HEADLIGHT.
APPLICATION FILED NOV. 27, 1918.
1,354,845.
Patented Oct. 5, 1920.
2 SHEETS—SHEET 2.
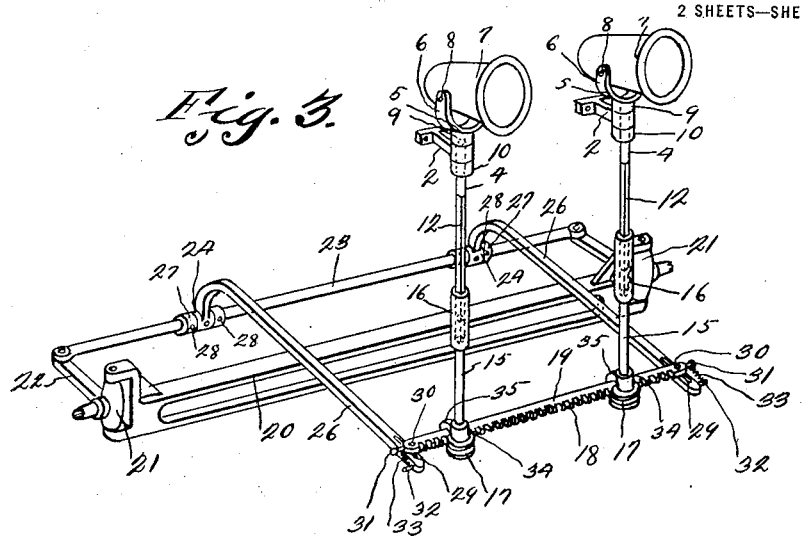
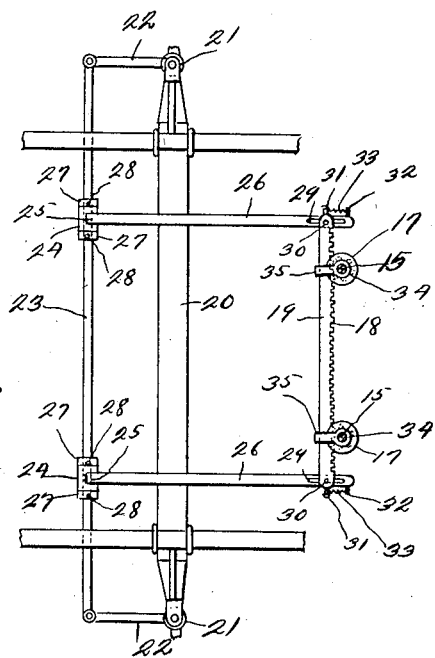
Witnesses
Inventor
N. R. Renze
By D. Swift & Co.
Attorneys

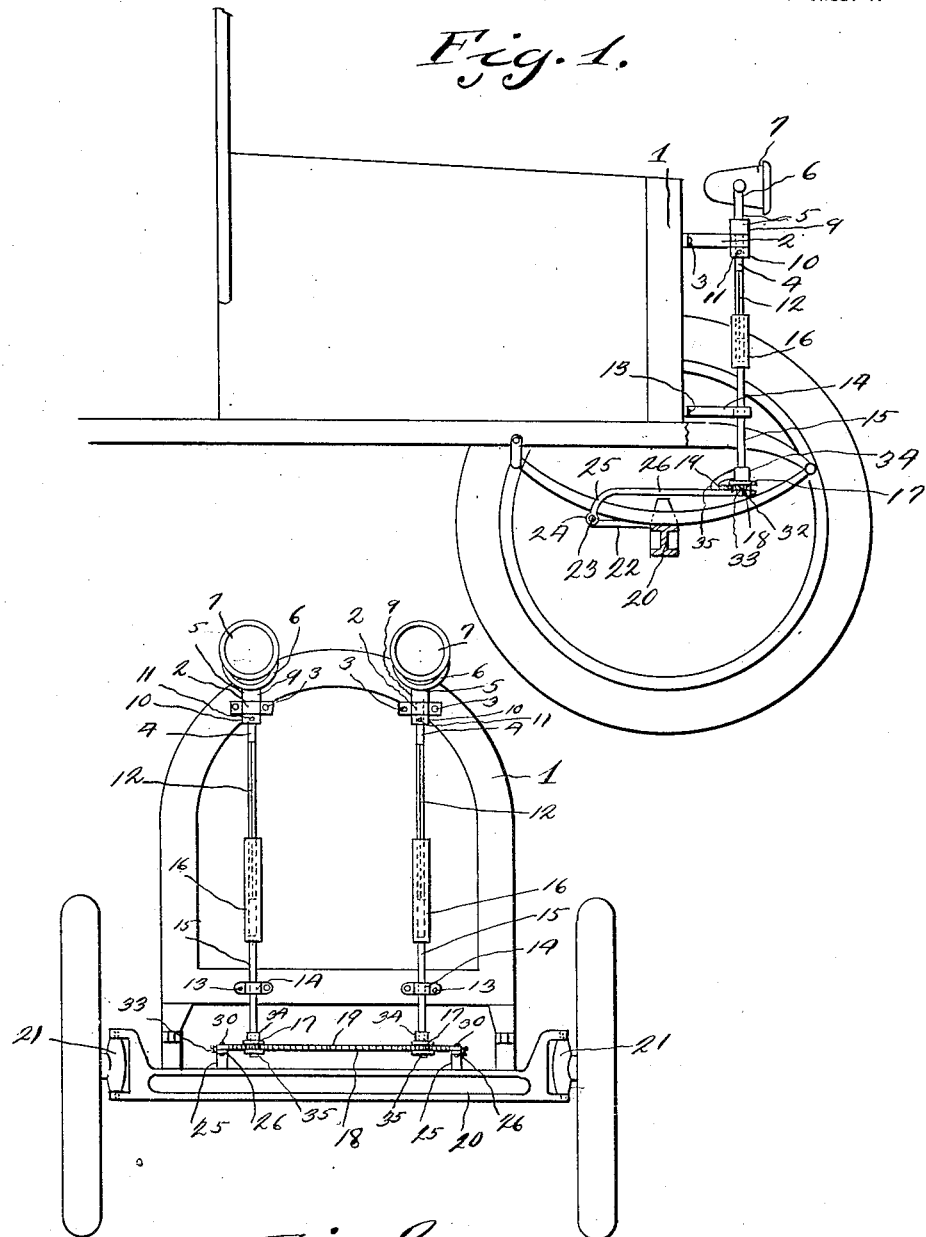

UNITED STATES PATENT OFFICE.

NICK RAFFAELE RENZE, OF CONNELLSVILLE, PENNSYLVANIA.

DIRIGIBLE HEADLIGHT.

1,354,845.

Specification of Letters Patent.

Patented Oct. 5, 1920.

Application filed November 27, 1918. Serial No. 264,359.

*To all whom it may concern:*

Be it known that I, NICK R. RENZE, a citizen of the United States, residing at Connellsville, in the county of Fayette, State of Pennsylvania, have invented a new and useful Dirigible Headlight; and I do hereby declare the following to be a full, clear, and exact description of the invention, such as will enable others skilled in the art to which it appertains to make and use the same.

This invention relates to an improved automobile dirigible lamp mechanism.

The invention aims to provide a mechanism of this kind, whereby as the front wheels of the automobile are turned in one direction or the other, the headlights or lamps will correspondingly turn.

A further object of the invention is to provide an improved construction of mechanism, to effect the turning of the lamps or headlights with the front wheels, the main feature of said mechanism comprising a yieldably mounted rack bar having slot and pin connections with forward arms or bars of the steering mechanism connecting rod, and meshing with pinions on the lower ends of the stems of the lamps, whereby the lamps will move in the direction of the wheels.

In practical fields the details of construction may necessitate alterations falling within the scope of what is claimed.

The invention comprises further features and combination of parts as hereinafter set forth shown in the drawings and claimed.

In the drawings:

Figure 1 is a view in side elevation of the front part of an automobile, showing the front axle in section and the lamp mechanism applied, the same being constructed in accordance with the invention.

Fig. 2 is a view in front elevation of the automobile also showing the lamp mechanism applied.

Fig. 3 is an enlarged detail perspective view of the lamp mechanism removed, more clearly showing the detail features of construction.

Fig. 4 is a plan view of the mechanism also showing the same detached.

Referring more especially to the drawings 1 designates the radiator end of the automobile, and 2 denotes brackets, which are secured at 3 to the front of the radiator. Mounted in bearings of the brackets are the reduced cylindrical stems 4 of the lamp holding brackets 5, which have forks 6, between which the lamps 7 are pivotally mounted as at 8. The reduced stems 4 project downwardly from the enlargements 9 of the lamp holding brackets 5, thereby being collars 10 secured at 11 to the reduced cylindrical stems 4, thereby preventing vertical movement of the stem through the brackets 2, yet the stems are permitted to rock in the brackets. The stems 4 are provided with extensions 12 rectangular in cross section. Also secured to the radiator as at 13 are brackets 14, through which stems 15 are movable slidably and rotatably. The upper ends of the stems 15 have tubular extensions 16, the interior bores of which are rectangular in cross section corresponding to and receiving the extensions 12 telescopically extensibly, so as to accommodate the vibrations of the body of the automobile. The lower ends of the stems 15 are provided with flanged gears or pinions 17, the teeth of which are engaged by the teeth 18 of the rack 19, which is disposed transversely. Carried by the usual axle 20 of the automobile are the conventional forms of knuckle hubs 21 provided with the usual rearwardly extending arms 22. Connecting between the arms 22 is the usual transverse steering connecting rod 23. Mounted upon the connecting rod 23 are the sleeve ends 24 of the downwardly turned rear end 25 of the forwardly extending arms 26, there being collars 27 secured at 28 on opposite sides of the sleeve ends to hold the arms 26 fixed and against axial movement of the arms on the connecting rod 23. The forward ends of the arms 26 have slots 29 through which the pins 30 (which pass through the ends of the rack 19) pass, so as to slidably connect the rack 19 to the forward ends of the arms 26. The extremities of the rack 19 have headed pins 31, between which and the headed pins 32 coil springs 33 connect, thereby acting to hold the teeth of the rack 19 at all times in mesh with the teeth of the pinion or gears 17, regardless of the position assumed by the connecting rod 23. By means of the flanges of the gears or pinions 17 disconnection of the racks with the pinions is prevented. In order to additionally prevent disconnection of the rack collars 34 are pinned to the lower ends of the stems 15 and are provided with arms 35 extending downwardly and under the rack 19. It is obvious that when the front wheels turn in one direction the lamps will turn in a corresponding direction, through the improved connections shown and described.

The invention having been set forth what is claimed as new and useful is:—

In an automobile headlight control comprising vertically disposed lamp posts pivotally mounted in brackets carried by an automobile body, the lower ends of said vertically disposed lamp post being provided with horizontally disposed gears, a transversely disposed rack bar meshing with said gears, the ends of said rack bar being provided with pins, said pins being disposed in elongated longitudinally disposed slots of arms carried by the connecting rod between the steering knuckles of the automobile, pins carried by the ends of the rack bar, pins carried by the ends of the arms carried by the steering knuckle connecting rod, said last named pins being outwardly disposed in relation to the inner side of the horizontally disposed gears and springs having their ends connected to the pins of the rack bar and the pins of the arms, said springs forming means for holding the rack bar in mesh with the horizontally disposed gears and also forming means for preventing rattling of the light control mechanism as a whole.

In testimony whereof I have signed my name to this specification in the presence of a subscribing witness.

NICK RAFFAELE RENZE.

Witness:
   P. BUFANO.